US011869316B2

(12) United States Patent
Myers et al.

(10) Patent No.: US 11,869,316 B2
(45) Date of Patent: Jan. 9, 2024

(54) CONTEST SYSTEM AND METHOD BASED ON BRACKET TOURNAMENTS

(71) Applicant: PBL, LLC, Las Vegas, NV (US)

(72) Inventors: Marlin Myers, Las Vegas, NV (US); Paul Cripe, Las Vegas, NV (US)

( * ) Notice: Subject to any disclaimer, the term of this patent is extended or adjusted under 35 U.S.C. 154(b) by 64 days.

(21) Appl. No.: 17/444,280

(22) Filed: Aug. 2, 2021

(65) Prior Publication Data

US 2022/0036703 A1 Feb. 3, 2022

Related U.S. Application Data

(60) Provisional application No. 63/060,559, filed on Aug. 3, 2020.

(51) Int. Cl.
*G07F 17/32* (2006.01)
*G06Q 50/34* (2012.01)

(52) U.S. Cl.
CPC ......... *G07F 17/3276* (2013.01); *G06Q 50/34* (2013.01); *G07F 17/3251* (2013.01); *G07F 17/3288* (2013.01)

(58) Field of Classification Search
CPC ............. G07F 17/3276; G07F 17/3251; G07F 17/3288; G06Q 50/34
See application file for complete search history.

(56) References Cited

U.S. PATENT DOCUMENTS

| | | | | |
|---|---|---|---|---|
| 8,070,583 | B2 * | 12/2011 | Baerlocher | G07F 17/3211 463/16 |
| 10,373,442 | B2 * | 8/2019 | Schlottmann | G07F 17/323 |
| 2008/0064502 | A1 * | 3/2008 | Schlottmann | G07F 17/3209 463/1 |
| 2022/0036703 | A1 * | 2/2022 | Myers | G07F 17/3288 |

* cited by examiner

*Primary Examiner* — Ronald Laneau
(74) *Attorney, Agent, or Firm* — FisherBroyles, LLP; Rob L. Phillips

(57) ABSTRACT

A system and method for operating lottery-style or sweepstakes-style contests based on a bracket tournament involving multiple future events with winners of each event advancing to a next round and eventually a final competition with a winner thereof being the winner of the tournament or a fixed number of non-bracket events. The system and method involve distributing random tickets including all possible outcomes of a group of future events. In one version, all possible outcomes are distributed such that at least one contestant will hold a ticket with all winning outcomes.

20 Claims, 22 Drawing Sheets

100

(PRIOR ART)

110

(PRIOR ART)

430

| Combination | Game 1 | Game 2 | Game 3 |
|---|---|---|---|
| 1 | A | C | A |
| 2 | A | C | C |
| 3 | A | D | A |
| 4 | A | D | D |
| 5 | B | C | B |
| 6 | B | C | C |
| 7 | B | D | B |
| 8 | B | D | D |

420

440

| Combination | Game 1 | Game 2 | Game 3 |
|---|---|---|---|
| 1 | A | C | A |
| 2 | A | C | C |
| 3 | A | D | A |
| 4 | A | D | D |
| 5 | B | C | B |
| 6 | B | C | C |
| 7 | B | D | B |
| 8 | B | D | D |

Fig. 8A

450

| Combination | Game 1 | Game 2 | Game 3 |
|---|---|---|---|
| 1 | A | C | A |
| 2 | A | C | C |
| 3 | A | D | A |
| 4 | A | D | D |
| 5 | B | C | B |
| 6 | B | C | C |
| 7 | B | D | B |
| 8 | B | D | D |

Fig. 8B

Fig. 12
655
PBL
You have been entered into the
Perfect Bracket Lottery
Ticket Purchased: WED MAR08 21 8:08:31 PM
Brackets Distributed: THU MAR18 21 9:00:00 AM
Contest End: TUE APR06 21 10:00:00 AM
Contest Username: Random_Auto_Generated123
www.perfectbracketlottery.com/Random_Auto_Generated123
OR
TICKET IS REQUIRED TO CLAIM A PRIZE
For more information visit www.perfectbracketlottery.com
650

700

705

710

| Example Pay Table for $10 Entry and 250,000 Entrants | | | | |
|---|---|---|---|---|
| Bracket Outcome | # of Outcomes | Odds | Payout per Bracket ($) | Total Payout |
| Perfect Bracket | 1 | 1 in 250,000 entrants | $1,000,000 | $1,000,000 |
| Perfect up to Final Four | 8 | 8 in 250,000 entrants | $62,500 | $500,000 |

Fig. 13

Fig. 14C
PACKERS
RAVENS
VIKINGS
49ERS
COWBOYS
840-1

CONTEST SYSTEM AND METHOD BASED ON BRACKET TOURNAMENTS

CROSS-REFERENCE

This application claims priority to U.S. Patent Application Ser. No. 63/060,559 filed Aug. 3, 3020 which is incorporated herein for all purposes.

FIELD OF INVENTION

The embodiments of the present invention relate to a bracket tournament system for facilitating a bracket tournament lottery.

BACKGROUND

March Madness is most likely the most well-known and popular bracket tournament in the world. Each March/April the NCAA runs a men's and women's basketball tournament starting with 64 teams comprising 63 games. Besides the popularity of watching the competitive basketball during the tournament, the tournament spawns millions of contests/sweepstakes involving the entry and completion of millions of tournament brackets whereby entrants predict the winners of each of the games in the tournament.

One offshoot of March Madness is contests including large prizes (e.g., $1B) for any person who completes a perfect bracket. The odds of selecting each of the 63 games (not including the play in games) correctly is 1 in 9.2 quintillion (to be more specific the odds are 1 in $2^{63}$ or 9,223,372,036,854,775,808) so that even a $1B payout can offered for a perfect bracket with essentially zero risk of it being won by any entrant.

Accordingly, in one embodiment of the present invention one contest entrant will hold a perfect bracket. Advantageously, the embodiments of the present invention permit real-time updates and engaging analytics as each game (or other event type depending on the tournament) is concluded such that all contest entrants can monitor whether they still have a chance to hold the perfect bracket.

SUMMARY

The embodiments of the present invention are directed to a system and method for operating lottery-style or sweepstakes-style contests based on a bracket tournament involving multiple events with winners of each event advancing to a next round and eventually a final competition with a winner thereof being the winner of the tournament. More specifically, the embodiments of the present invention may be utilized with any tournament or schedule having a finite field.

In broadest terms, in one embodiment, the system and method involve: at least one processor running executable instructions related to a group of future events, each future event having a winner and loser; and wherein said at least one processor running said executable instructions: (i) randomly distributes to multiple contestants a plurality of tickets each comprising possible outcomes of each of said future events, each of said plurality of tickets being unique; (ii) tracks results of said future events; (iii) based on said tracked results of said future events, updates a status of each of said plurality of tickets held by said multiple contestants; and (iv) causes an award or prize to be provided to one or more contestants holding tickets identifying at least a threshold number of future events resulting in a winning outcome.

Another embodiment involves a system comprising: at least one processor running executable instructions related to a group of future events, each future event having a winner and loser; and wherein said at least one processor running said executable instructions: (i) randomly distributes to multiple contestants a plurality of tickets comprising possible outcomes of each of said future events such that a ticket associated with every set of possible outcomes is distributed, each of said plurality of tickets being unique; (ii) tracks results of said future events; (iii) based on said tracked results of said future events, updates a status of each of said plurality of tickets held by said multiple contestants; and (iv) causes an award or prize to be provided to the one contestant holding a ticket comprising all winning outcomes.

Another embodiment involves a system comprising: at least one processor running executable instructions related to a group of future events, each future event having a winner and loser; and wherein said at least one processor running said executable instructions: (i) receives user instructions for a contest including selected future events, amount of entry fee, number of paid positions and percentage payout breakdown; (ii) generates a prize pool and pay table based on entry fee, number of paid positions and percentage payout breakdown; (iii) transmits contest details to potential contestants as identified by said user; (iv) receives entries from said contestants; upon receiving a threshold number of entries, randomly distributes to multiple contestants a plurality of tickets each comprising possible outcomes of each of said future events, each of said plurality of tickets being unique; (v) tracks results of said future events; (vi) based on said tracked results of said future events; (vii) updates a status of each of said plurality of tickets held by said multiple contestants; and (viii) causes an award or prize to be provided to one or more contestants holding tickets identifying at least a threshold number of future events resulting in a winning outcome.

Another embodiment involves a system comprising: at least one processor running executable instructions related to a group of future events, each future event having a winner and loser; and wherein said at least one processor running said executable instructions: (i) determines a number of contestants; (ii) divides a total number of possible sets of outcomes associated with said group of future events; (iii) randomly distributes to each contestant an equal number of tickets comprising said total number of possible sets of outcomes associated with said group of future events, each of said number of tickets being unique; (iv) tracks results of said future events; (v) based on said tracked results of said future events, updates a status of each of said plurality of tickets held by said contestants; and (vi) causes an award or prize to be provided to the at least one contestant holding a ticket comprising all winning outcomes.

While the embodiments of the present invention are ideal for bracket tournaments based on sporting events, those skilled in the art will recognize that bracket tournaments based on any competitive events, including non-sporting events, may benefit from the embodiments of the present invention. For example, a bracket tournament for determining the greatest rock n'roll band ever where individual competitive events are based on tallied votes, may use the system and method detailed herein. Also, non-bracket events may utilize the embodiments of the present invention.

Other variations, embodiments and features of the present invention will become evident from the following detailed description, drawings and claims.

BRIEF DESCRIPTION OF THE DRAWINGS

FIG. 8A illustrates groupings associated with winners of game 1 of the four-team bracket of FIG. 6;

FIG. 8B illustrates groupings associated with winners of game 2 of the four-team bracket of FIG. 6;

FIG. 13 illustrates an exemplary pay table of the type suitable for the embodiments of the present invention.

DETAILED DESCRIPTION

Figure 1A:
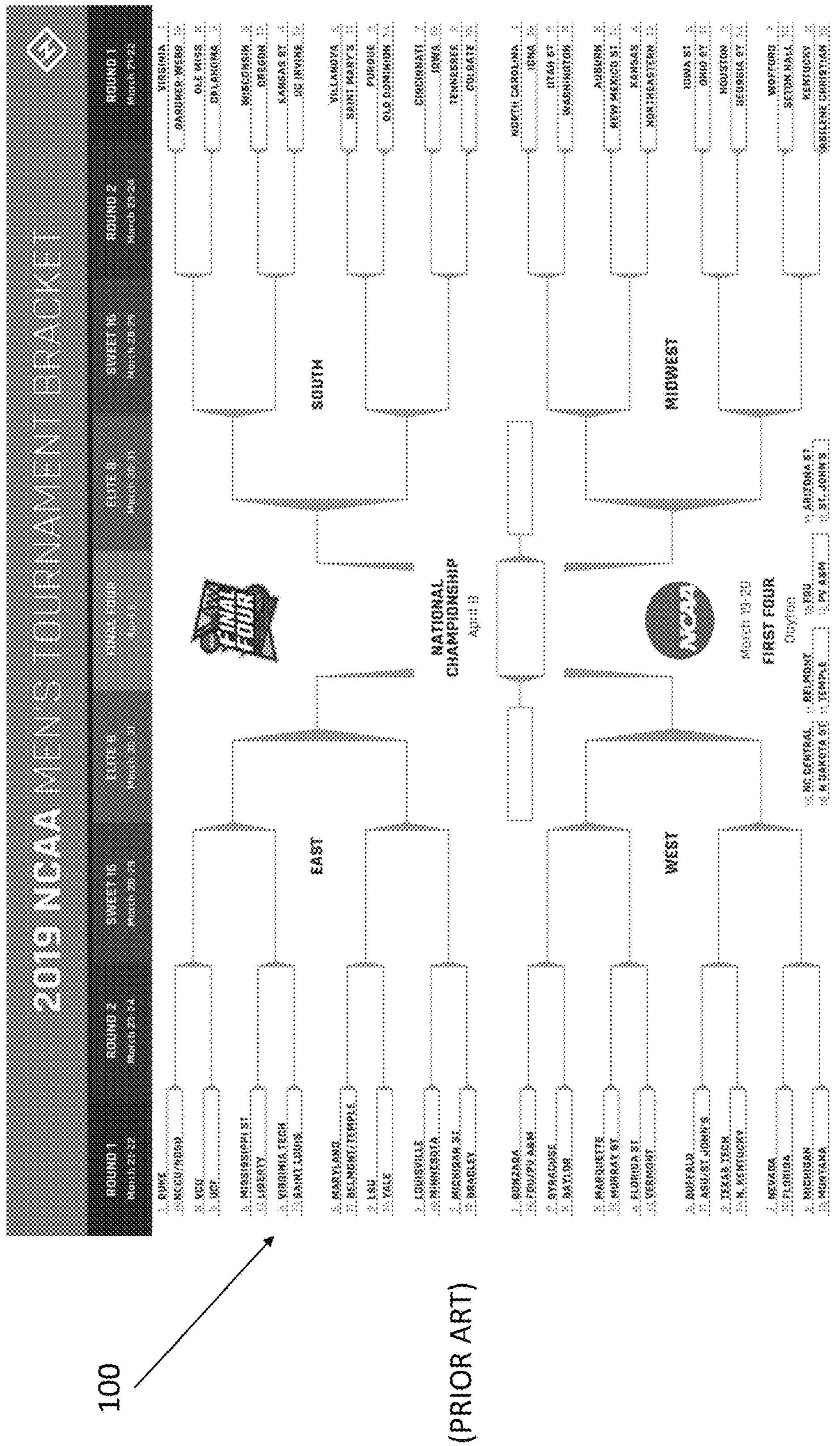
FIG. 1A illustrates an exemplary bracket tournament based on the 2019 NCAA's March Madness men's basketball tournament.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a system and method according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS, Python or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams.

Figure 1B:
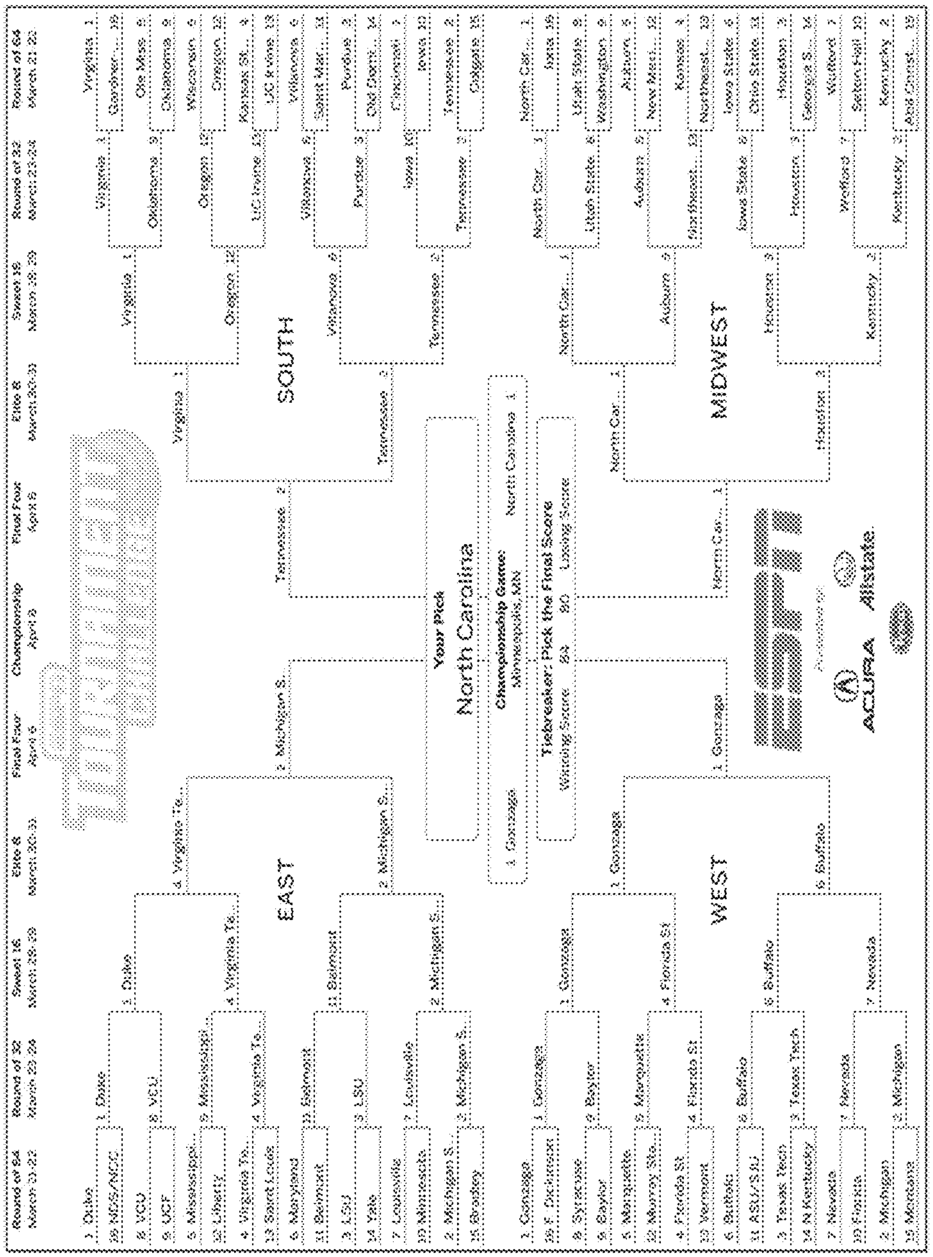
FIG. 1B illustrates the exemplary bracket tournament from FIG. 1A completed with one possible bracket outcome.

FIG. 1A shows an exemplary bracket tournament 100 of the type suitable for the embodiments of the present invention. With the bracket tournament 100 shown, there are 9.2 quintillion possible unique bracket outcomes. FIG. 1B shows the exemplary bracket tournament 100 completed with one such possible bracket outcome 110. The detailed description herein focuses on the March Madness bracket tournament, but the system and method disclosed herein may be used with any bracket-style tournament or group of future events (e.g., professional playoff tournaments (e.g., NHL), weekly slate of NFL games, World Cup, etc.).

Figure 2:
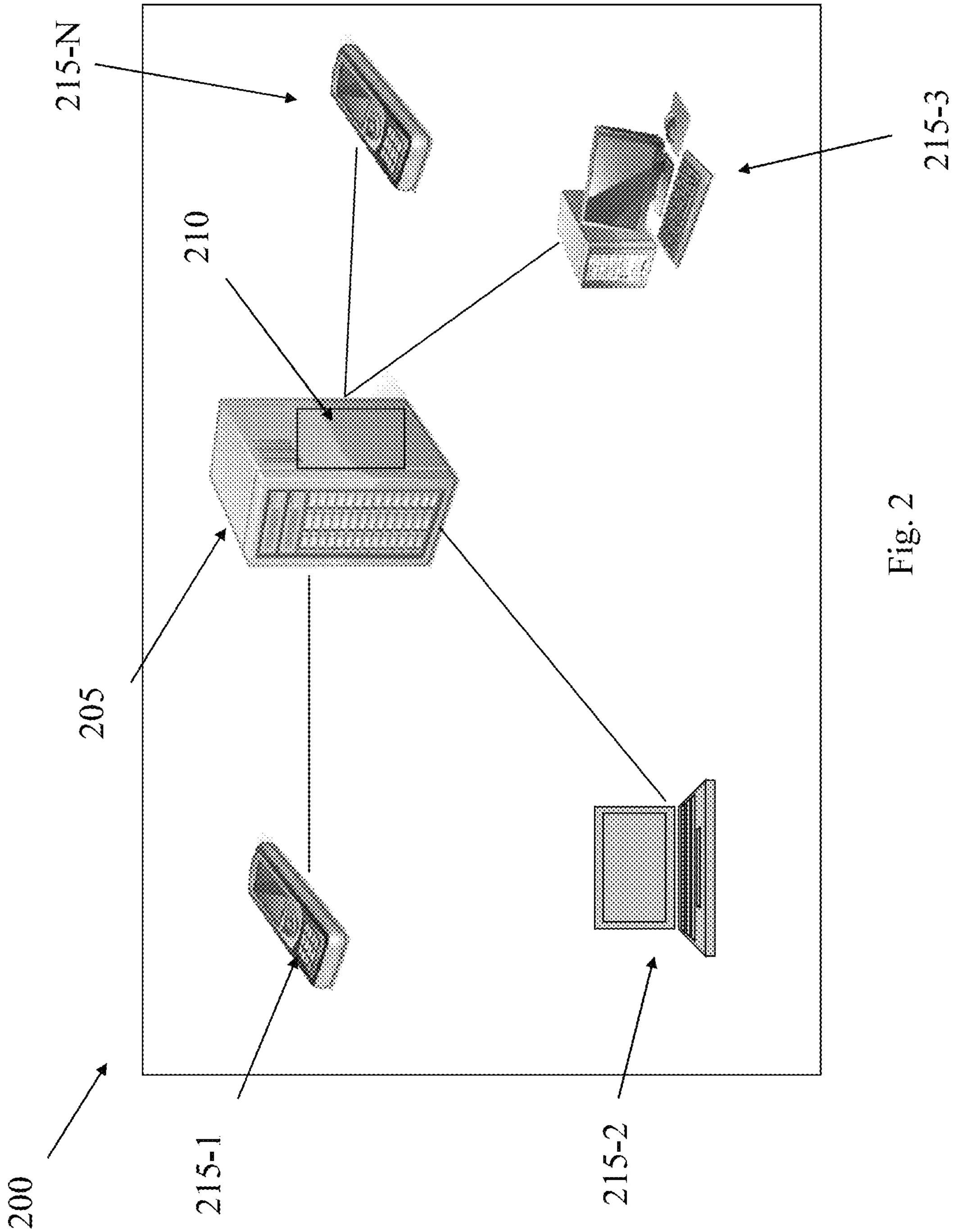
FIG. 2 illustrates a block diagram of a system that may be used to facilitate the embodiments of the present invention.

FIG. 2 shows a block diagram of a network 200 of the type that may facilitate the embodiments of the present invention. The network 200 comprises a processor-equipped contest server 205, including one or more processors 210 running contest software, and remote devices 215-1 through 215-N (e.g., smart phones) configured to access said contest server 205 for purposes described herein. In one embodiment, the contest may be accessed via a software application ("App") downloaded onto smart devices. Those skilled in the art will recognize that contestants may enter a contest via a mobile device, laptop computer, desktop computer, kiosk or via a sportsbook's over-the-counter system.

Figure 3:
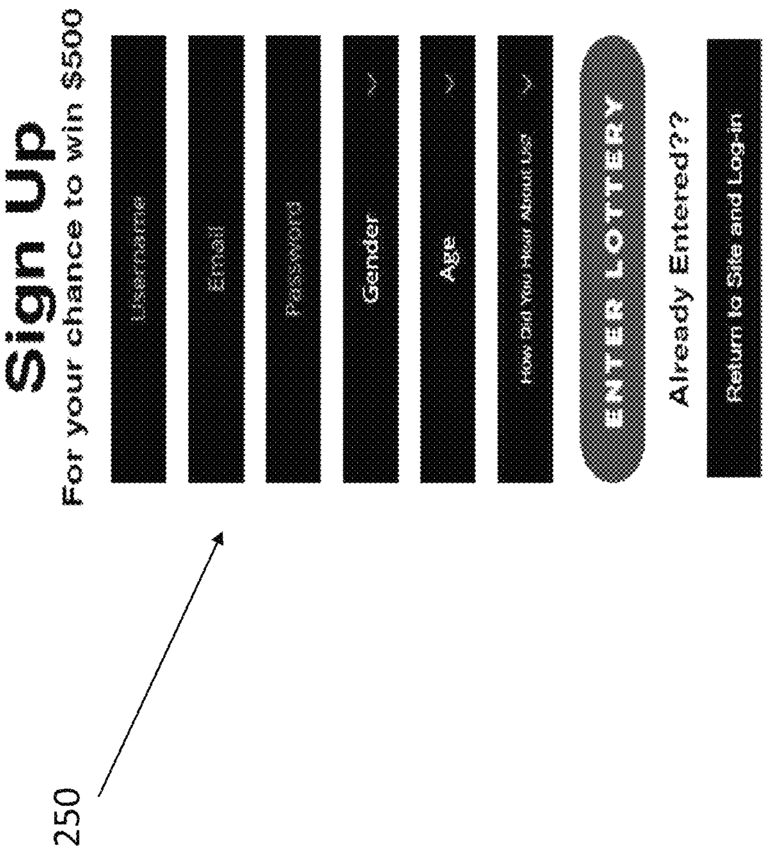
FIG. 3 illustrates an exemplary mobile device user interface for entering a contest according to the embodiments of the present invention.

FIG. 3 shows a flow chart 300 detailing the methodology undertaken by the system according to the embodiments of the present invention. At 305, contest software determines the possible number of outcomes for the subject tournament (e.g., 9.2 quintillion for the March Madness tournament) or is provided with the information. At 310, the contest software may generate a proposed payout scheme associated with the contest or may be provided with the payout scheme. In one example, the payout scheme provides prizes based on the number of entrants and the entry fees paid thereby. Alternatively, the entrants may enter promotions or sweepstakes free of charge for a chance to win prizes.

In a specific example, assuming 10,000 entrants each pay $5 per entry, the prize pool is $50,000 minus any fees held by the operator for running the contest. If the operator holds 5%, then the prize pool is $47,500 (calculated as $50,000−($50,000×0.05)=$50,000−$2500=$47,500). The operator may of course hold more or less of the prize pool. In one payout scheme, the entire prize pool is paid to the player holding the winning bracket outcome which depending on the embodiment, may be the perfect bracket (if all possible bracket outcomes are distributed) or may be the bracket outcome nearest to the perfect bracket (if less than all possible brackets are distributed). The payout scheme may include payouts for a perfect bracket and one or more nearest brackets and so on. FIG. 13 shows an exemplary pay table 700 with a winner 705 receiving two-thirds of the prize pool and eight $2^{nd}$ place finishers 710 receiving collectively one-third of prize pool. Indeed, the payout scheme may take any suitable form devised by the operator and may or may not relate to the entrant fees.

At 315, entrants sign up or register for the contest. FIG. 3 shows an exemplary sign-up page 250 from a mobile smart device, laptop, desktop or the like. The process is similar whether accomplished via an online or mobile platform. The entrant first creates an account and, at 320, is automatically entered into an entrant database. At 325, the database is input into a module that assigns each entrant a random "entrant/participation ID" that is used to keep track of their bracket outcomes throughout the entirety of the contest.

Figure 12:
FIG. 12 illustrates an exemplary ticket detailing a contestant having entered a contest lottery according to the embodiments of the present invention.

When conducted through a brick-and-mortar facility or physical distribution, the system utilizes "point of purchase" tickets and instant electronic entry into an entrant database based on the location where the point of purchase ticket is purchased. Each entrant is given a randomly generated username (or the entrant may provide this) and, as shown in FIG. 12, each ticket 650 includes a unique barcode/QR code 655 or other indicia that can be read causing the entrant to be entered into the database and contest. From an online dashboard, entrants are able, as described in more detail below, to view their custom analytics, personalize their username if not provided previously, and enter an email/SMS address to receive contest information directly to their personal email/SMS accounts. In one embodiment, a physical ticket includes a 'URL' identifying an entrant online dashboard as well as an alternative means of setting up an entrant account (either via phone or mail) for those without a smart device or access to the internet.

In another embodiment, the point of purchase tickets may be read by dedicated kiosks, sports books or similar physical locations to update entrants on the performance of their bracket outcomes in generally real-time based on tournament game (or other event) results.

At 330, based on the contest and entrant ID, the contest software randomly distributes one or more unique bracket outcomes, each assigned a unique identifier, to each entrant. In one embodiment, entrants may purchase more than one entry and are thus entitled to a number of bracket outcomes commensurate with the number of entries. There are generally two types of contests, namely a first contest that distributes all possible bracket outcomes amongst entrants and a second contest that distributes less than all possible bracket outcomes to entrants. If all bracket outcomes are distributed, one entrant is guaranteed to win with a perfect bracket. With the second contest, a perfect bracket is not guaranteed.

In either instance it is also possible to reduce the number of possible outcomes to make the management simpler and to eliminate unlikely outcomes by either excluding certain possible outcomes or pre-selecting certain possible outcomes. By way of example, in one embodiment, again, using the March Madness bracket tournament, the system may be programmed to remove any possible outcomes where a number 16 seeded team beats a number 1 seeded team in the first round.

When distributing less than all possible bracket outcomes, the contest may be used to award a progressive jackpot to an entrant that ultimately holds a perfect bracket over a course of successive tournaments. Normally progressive jackpots are funded using a small portion or percentage of entrant fees (e.g., 5% of each entrant fee is earmarked for the progressive jackpot). In this manner, the jackpot carries over, and may increase, from one contest to the next, until an entrant holds the perfect bracket. Using the March Madness tournament as the example, in one embodiment, with 10,000,000 entrants, each entrant may receive 100,000,000,000 unique possible bracket outcomes resulting in 1,000,000,000,000,000,000 possible bracket outcomes being distributed or about ⅑ of the total bracket outcomes possible. Thus, the odds that a perfect bracket will be distributed is about 1 in 9. A payout scheme for this exemplary contest may comprise a prize pool of $50,000,000 ($5 per entry). In such an example, $10,000,00 may be reserved for a perfect bracket jackpot, $1,000,000 may go to the operator, and the balance of $39,000,000 may be paid out in some tiered arrangement to the top 10,000 bracket outcomes distributed. For example, the winner may receive 10% or $3,900,000 with second place receiving 5% or $1,8000,000 and so on with the final 5,000 finishers receiving $1,000 each. The payout scheme can be set by the operator and need only ensure that the $39,000,000 is paid out to the 10,000 winners or whatever number of winners is pre-established.

In another progressive embodiment, a portion or percentage of entrant fees paid for a first set or group of tournaments (e.g., daily tournaments) may be used to fund a large contest payout. For example, a small percentage of entrant fees for daily tournaments may be pooled to grow a large prize for the March Madness contest.

Winners and payout places may be determined using any number of scoring systems. For example, in the simplest scoring system, each winning game (or event) receives 1 point. In other scoring systems, winning games (or events) in each successive round receive more points. With the March Madness as the example, each win in round 1, receives 1 point, each win in round 2, receives 2 points, each win in round 3, receives 3 points, each win in round 4, receives 4 points, and each win in round 5, receives 5 points and a win in the final game receives 6 points. Countless scoring systems are available and may be determined by the operator. It is also possible that the entrant holding the final perfect bracket before losing a game may be deemed the winner. In this instance, no entrant receives a perfect bracket, but one or more entrants may hold a bracket that is perfect for two rounds of the six-round tournament before losing a game in which case those one or more entrants would be deemed the winners or at least awarded a prize.

One of the advantages of the embodiments of the present invention is that the entrants need not have any skill related to selecting the winners of the games (or other events). That is, winners are randomly determined based on the distributed bracket outcomes and not the entrants' skill level. The system and method according to the embodiments of the present invention increases the population from which entrants may be drawn. That is, unskilled and skilled entrants can be expected to enter whereas primarily skilled players enter a bracket tournament requiring entrants to select the winners of each game.

In one embodiment, distributing the bracket outcomes uses a specific methodology that does not involve the challenge of storing all 9.2 quintillion possible bracket outcomes. Importantly, after round 1 of the 64-team NCAA Men's Basketball tournament there are only $2^{31}$ or 2,147,836,648 possible bracket outcomes which can be stored and searched using standard processing power. In one embodiment, a pattern-based module divides up all possible bracket outcomes to X entrants in the pool. Thus, the randomness of the system does not relate to distributing the bracket outcomes to a specific entrant ID but rather how the X entrants are assigned a random entrant ID from 1 to X. By randomly assigning each of the X entrants a numeric entrant ID ranging from 1 to X a simple pattern determines which bracket outcomes each entrant receives.

By way of example, if there are 12 entrants, each entrant is randomly assigned a numeric entrant ID between 1 and 12. A random number generator or similar means then assigns the entrant ID. Each unique bracket outcome is already assigned a unique number between 1 and 9223372036854775808. For 12 entrants, entrant 1 receives bracket outcomes 1, 13, 25, 37, etc.; entrant 2 receives bracket outcomes 2, 14, 26, 38, etc., and so on for each entrant. To locate which entrant has a particular bracket outcome, the system employs a reverse process. For example, bracket outcome 12,345,678 belongs to entrant 6 (12,345,678/12=1,028,806.5 and 12×0.5=6). Accordingly, the system need not store every entrant's combinations since contest software can reverse engineer which entrant has which bracket outcomes.

Figure 4:
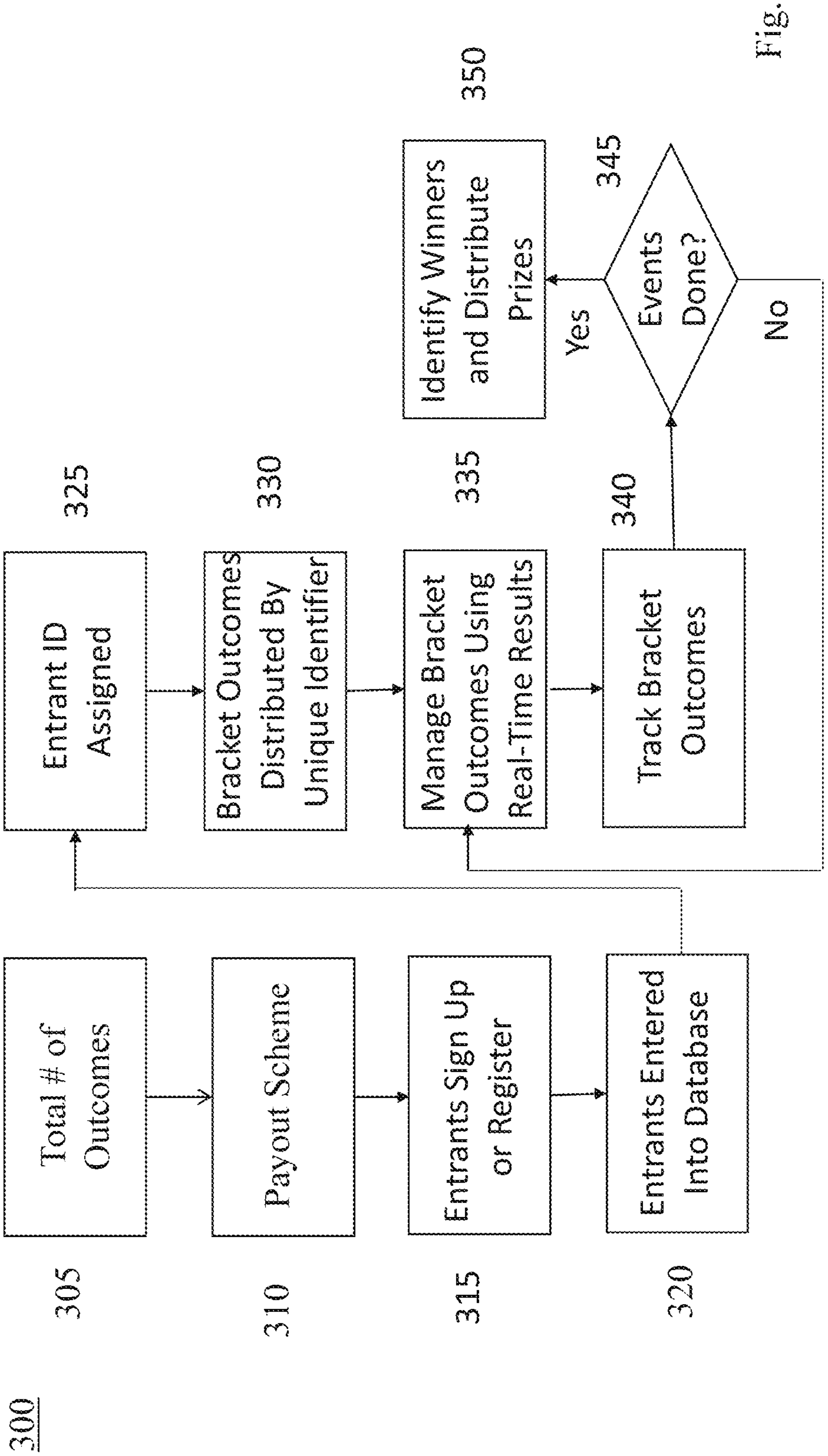
FIG. 4 illustrates a flow chart of one methodology for implementing a contest according to the embodiments of the present invention.
Figure 4:

At 335, the system, via the contest software, manages the distributed bracket outcomes to generate generally real-time analytics that entrants may access as the tournament progresses. Indeed, in one embodiment, the system updates after each game result to reflect standings, predictions regarding chances of winning, number of remaining perfect brackets, etc. FIG. 4 shows an exemplary leaderboard 400. In one embodiment, a contestant or other party may designate one or more contestants to follow. As shown, Luis 777 has been designated as evidenced by the star 401. In such a case, the designator is able to easily follow the status of Luis 777 in the contest.

Figure 5:
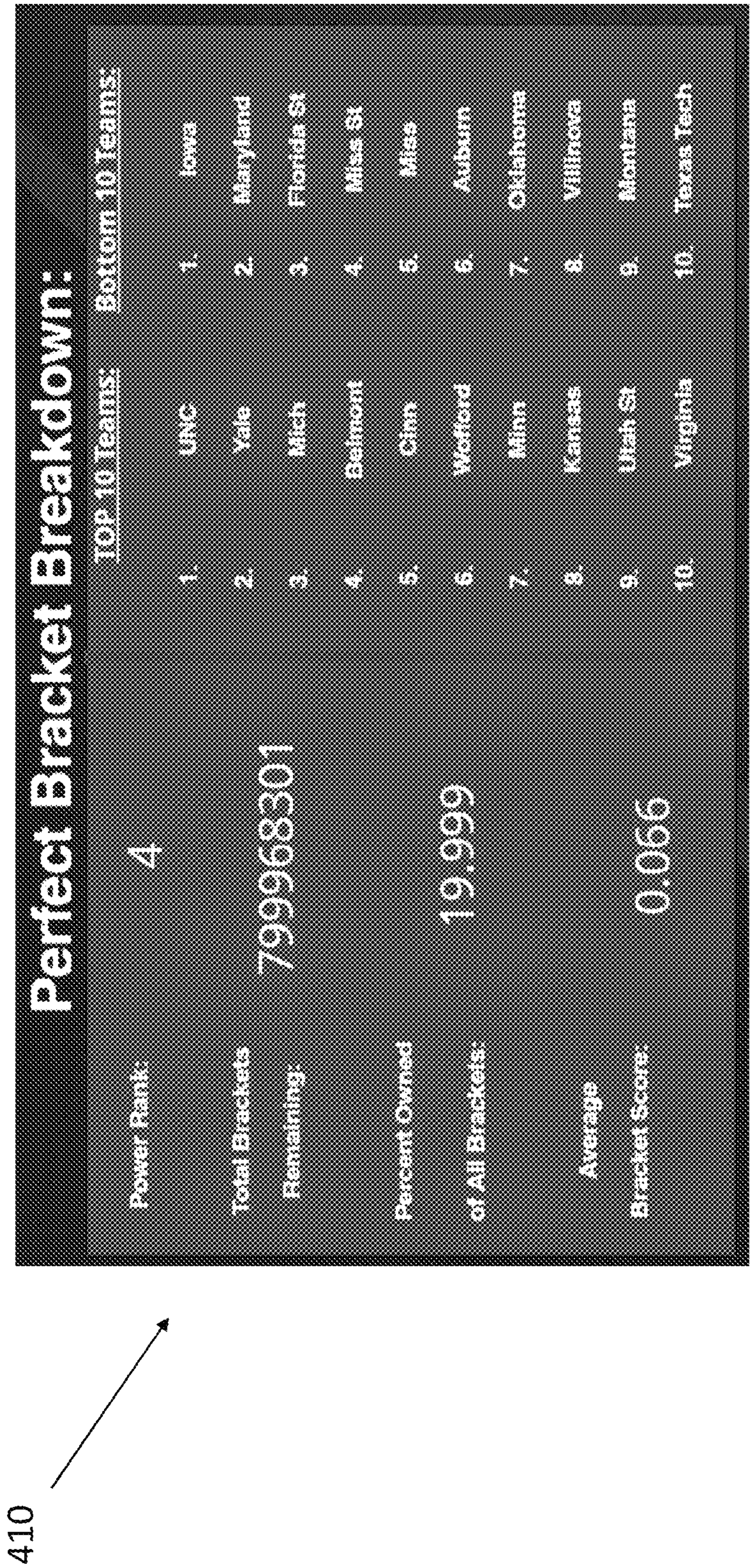
FIG. 5 illustrates a bracket outcome breakdown according to the embodiments of the present invention.

In one embodiment, management of the distributed brackets includes functionality to engage entrants throughout the tournament. This is especially helpful since entrants may have large numbers of bracket outcomes such that it may be impossible to follow them all individually. In one such embodiment, once bracket outcomes have been distributed, the system evaluates each entrant's subset of bracket outcomes and generates relevant key performance indicators (KPIs) such as top bracket outcomes giving the entrant the best chance of winning, top remaining bracket outcomes, power ranking, etc. The generated KPIs are then disseminated electronically to the entrants to maintain their interest and keep them informed. FIG. 5 shows an exemplary table 410 detailing data related to an entrant's bracket outcomes.

In one embodiment, the system is configured to auto-populate specific brackets based on a defined set of criteria (e.g., top remaining bracket outcome for an entrant or worst remaining bracket outcome for the entrant). The system is further configured to locate an entrant that has a specific bracket outcome based on a comparison with a specific completed bracket outcome.

Figures 6, 7:
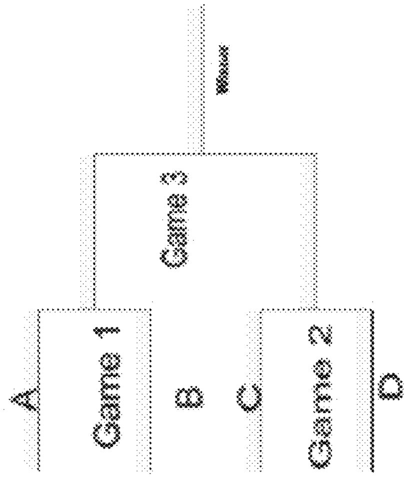
(PRIOR ART) Fig. 6
FIG. 6 illustrates a 4-team bracket according to the prior art.
FIG. 7 illustrates a table of all possible bracket outcomes associated with the 4-team bracket of FIG. 6.

At 340, the system tracks the bracket outcomes using specific methods designed to reduce the processing power necessary to manage the data. This is especially critical for tournaments with large numbers of games or events. An exemplary 4-team tournament (teams A, B. C and D) 420, as shown in FIG. 6, is used to show how the method works. A 4-team, single elimination, tournament comprises three games and thus $2^3$ or 8 unique combinations. In one embodiment, as shown in table 430 of FIG. 7, the system is configured to identify the winner of each game and put that team in order for each round. Table 430 reveals a pattern whereby team A will win game 1 50% of the time and team B will win game 1 the other 50% of the time. The same holds true for teams C and D in game 2. Tables 8A 440 and 8B 450 show this feature. For game 3, there are only 2 remaining teams. From this, the system software is configured to understand that each of the 4 teams (assuming equal talent) has a 1 in 4 chance of winning the tournament and there are 8 possible unique "codes" (e.g., ACA, ACC . . . ) as shown in FIG. 7.

Figure 9:
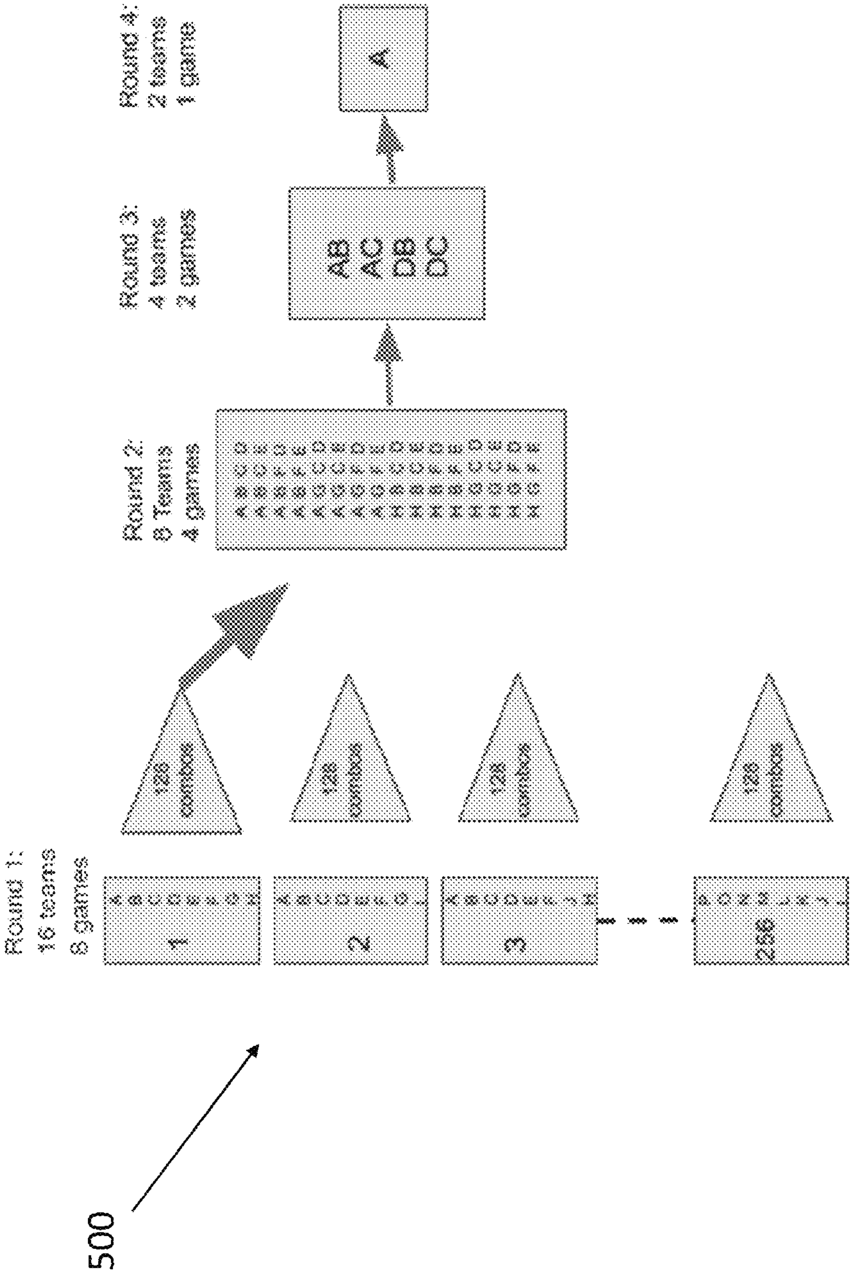
FIG. 9 illustrates a breakdown of a 16-team bracket tournament.
Figure 10A:
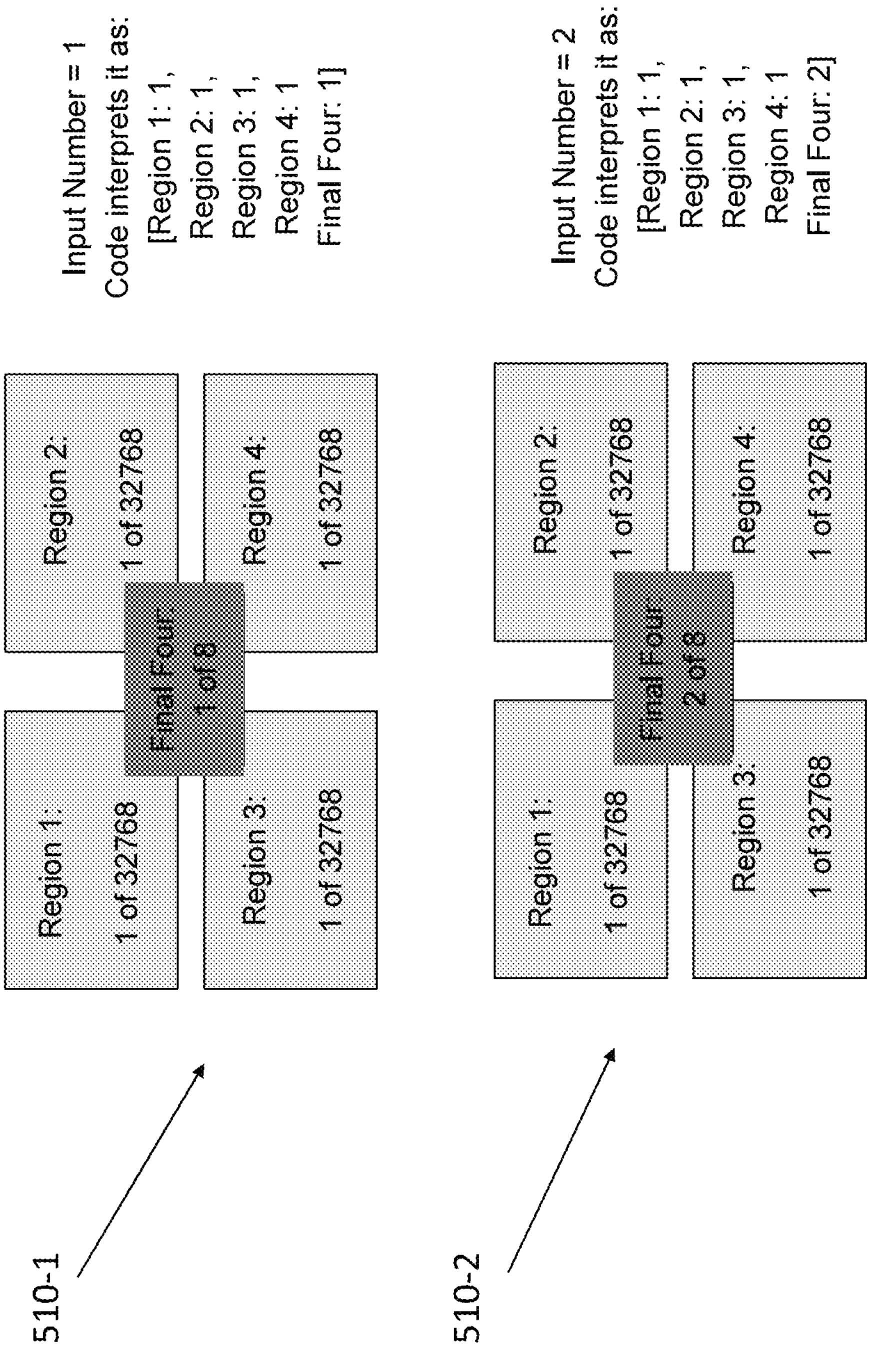
FIGS. 10A-10E illustrate mapping associated with tracking bracket outcomes according to the embodiments of the present invention.
Figure 10B:
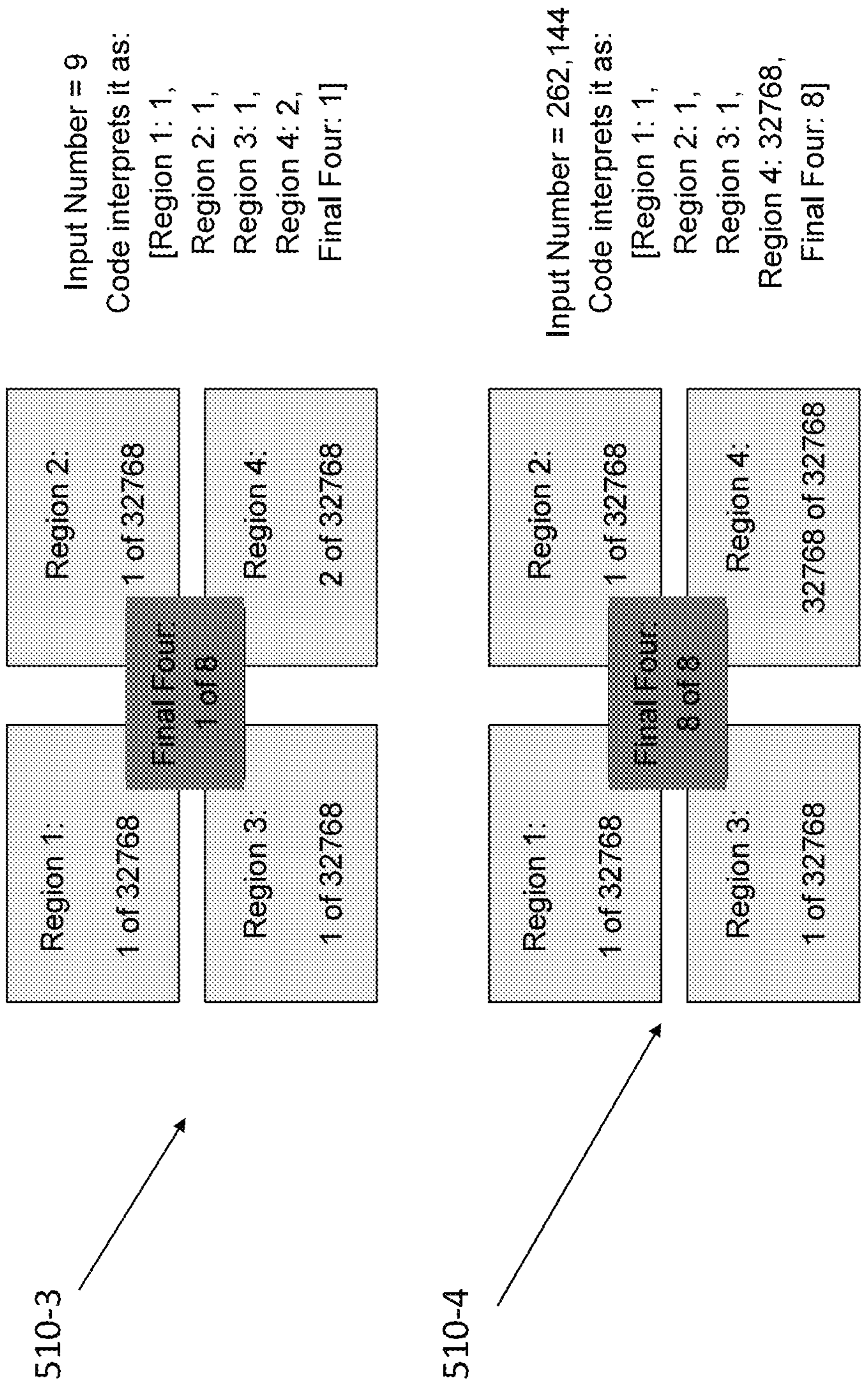
Figure 10C:
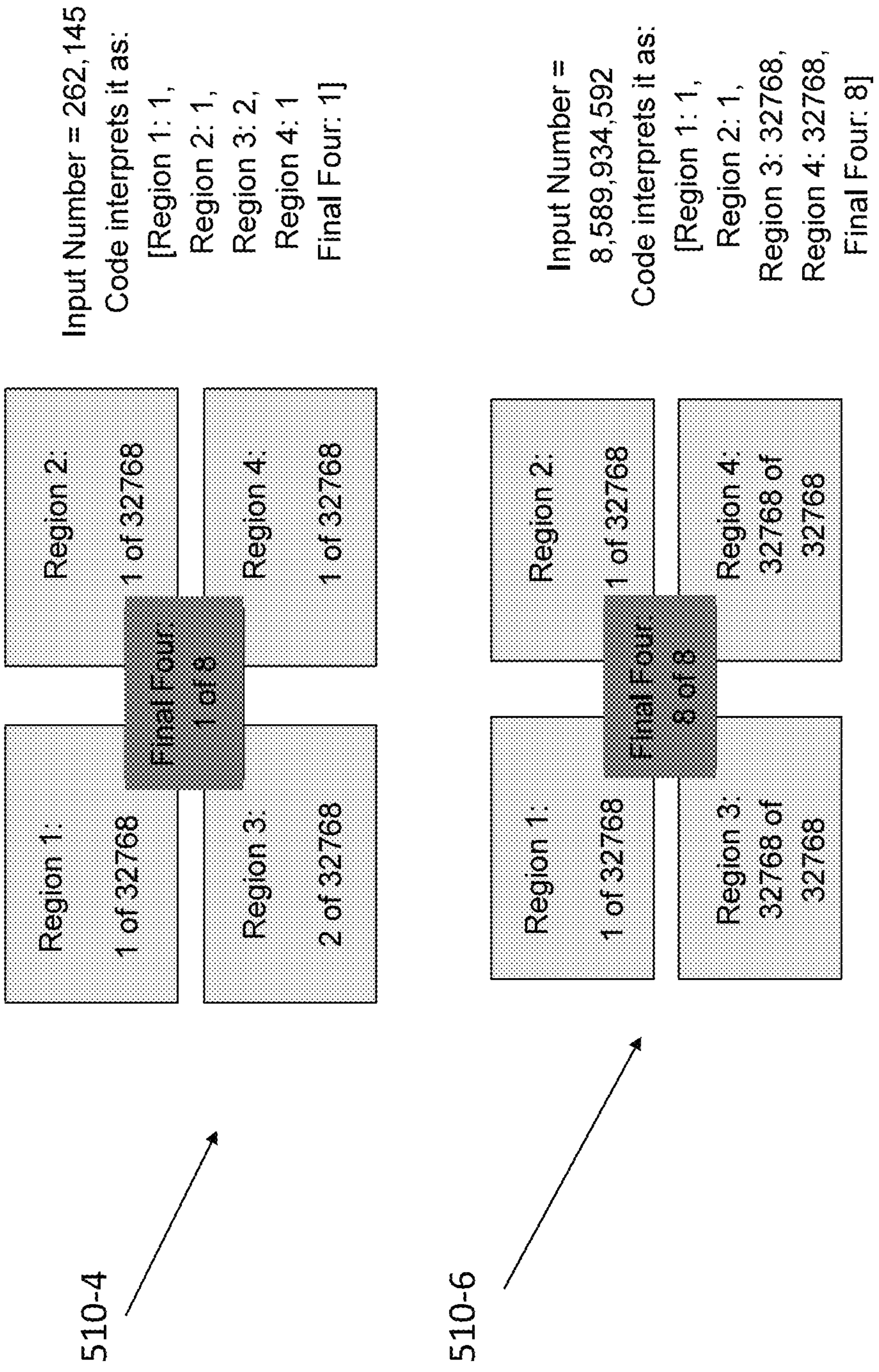
Figure 10D:
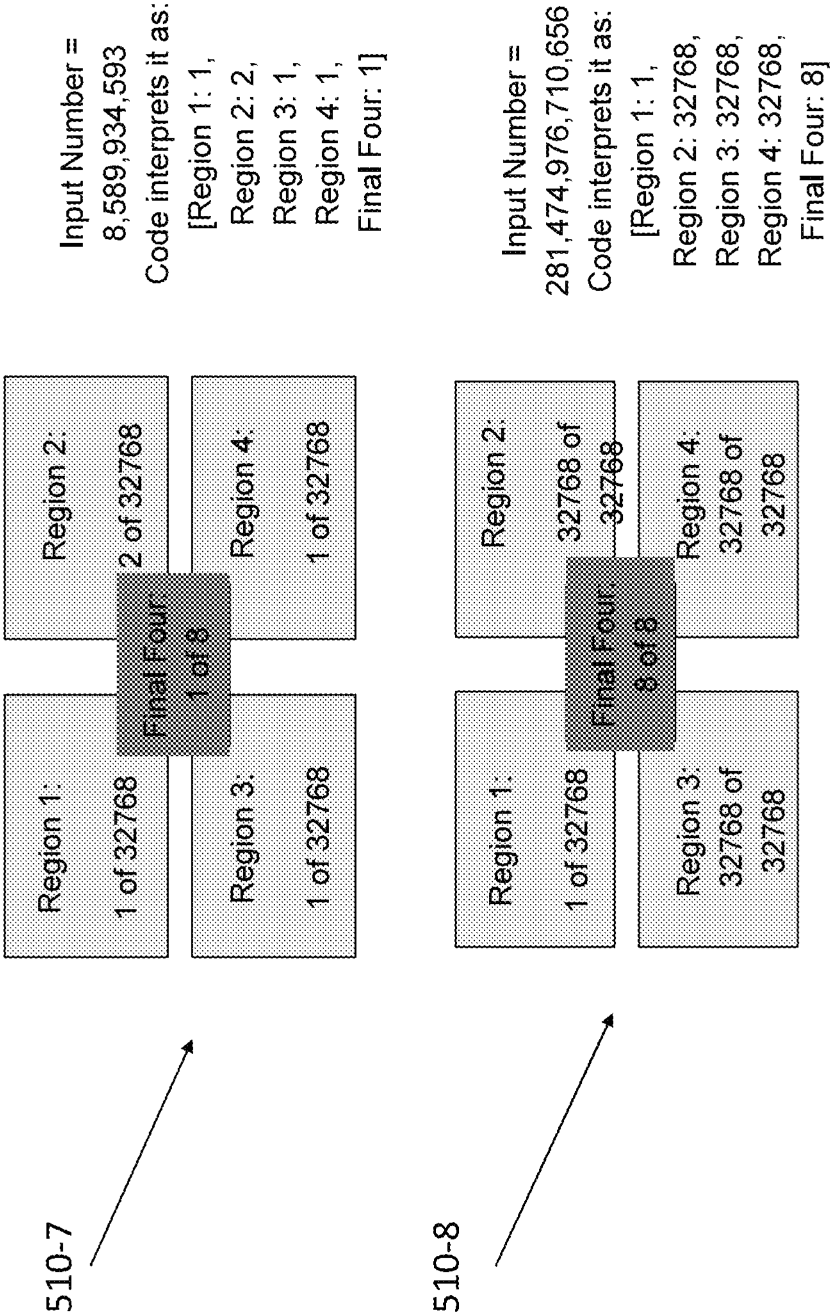
Figure 10E:
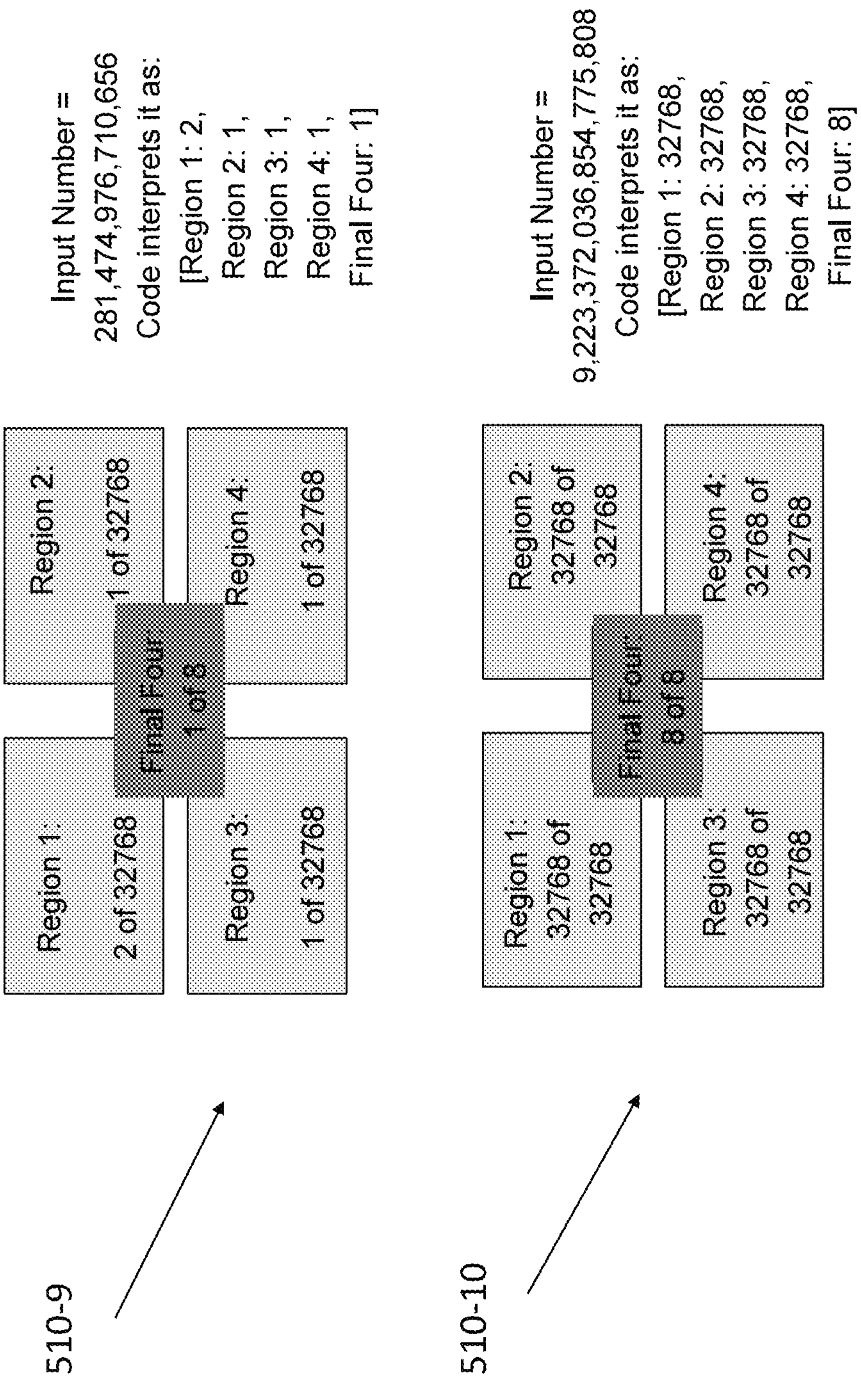

Now referring to the diagram 500 of FIG. 9, the "code" method is shown for a 16-team tournament. The primary factor for making the codes correlate with the number correctly is knowing where the change is going to occur for each round. For example, if code "ABCDEFGH ABCD AB A" correlates to the number 1, the first eight digits of the code will be the same for the next 127 numbers. The first twelve digits would be the same for the next 8 numbers with only the last digit of the code changing for number 2 (i.e., code: "ABCDEFGH ABCD AB B"). The only change between number 1 and number 2 correlates to a different team winning the final game, the rest of the code is identical. The system software allows for the $3^{rd}$ and $4^{th}$ rounds to play out their 8 possible combinations, like the 4-team tournament detailed above, before changing the code to the second unique combination of the $2^{nd}$ round. Therefore, number 9 code is "ABCDEFGH ABCE AB A". This pattern repeats until the final unique combination of the $2^{nd}$ round is finished going through its 8 respective combinations of the $3^{rd}$ and $4^{th}$ rounds. Number 257 corresponds to a switch to the second unique combination of the $1^{st}$ round but keeps the first unique combinations of the $2^{nd}$, $3^{rd}$, and $4^{th}$ rounds (code: "ABCDEFGI ABCD AB A") and the respective 128 combination tree repeats again until all unique combinations are complete. This pattern again continues until all 256 $1^{st}$ round unique combinations finished each of their 128 respective combinations (256×128=32768).

The same methodology may be expanded to a 64-team tournament. The 64-team bracket is first split into four, 16-team brackets followed by a 4-team tournament. Given the 16-team tournament has $2^{15}$ or 32768 possible outcomes and a 4-team tournament has $2^3$ or 8 possible outcomes, the system may treat each region as a separate 16-team tournament followed by a 4-team tournament achieving the same results as iterating through each game of each round. In other words, each region has $2^{15}$ or 32768 items that we can uniquely match. $2^{15}\times2^{15}\times2^{15}\times2^{15}=2^{60}$. After each unique combination from each region, a 4-team tournament remains with $2^3$ or 8 possible combinations ($2^{60}\times2^3=2^{63}$ or 9223372036854775808).

The diagrams 510-1 through 510-10 in FIGS. 10A-10E show the numbers where key changes occur. The system functions by intaking any number between 1 and 9223372036854775808 and breaking it down into five separate numbers corresponding to each region and the final four combinations. The corresponding numbers are plugged into the 16-team tournament coding function and the 4-team tournament coding function to give a unique code for each input number (between 1 and 9223372036854775808).

Once, at 345, it is determined that all events have ended (i.e., the tournament ends), at 350, the system identifies one or more winning bracket outcomes and distributes prizes and awards. As detailed herein the prizes and awards are based on the perfect bracket, best brackets, brackets being perfect the longest and/or any other criteria desired by operator. For example, a prize may go to an entrant holding a bracket that loses every game or event (i.e., perfectly wrong bracket).

With bracket style tournaments, a lottery may be created after each round. For example, using March Madness, a first lottery is based on all games, a second lottery may be based on all games after the first round has been played and a third lottery may be based on all games after the second round has been played. In this manner, the total number of outcomes decreases with each round played such that the odds of winning increase. Such an arrangement creates unique lottery schemes from a single bracket.

Figure 11:
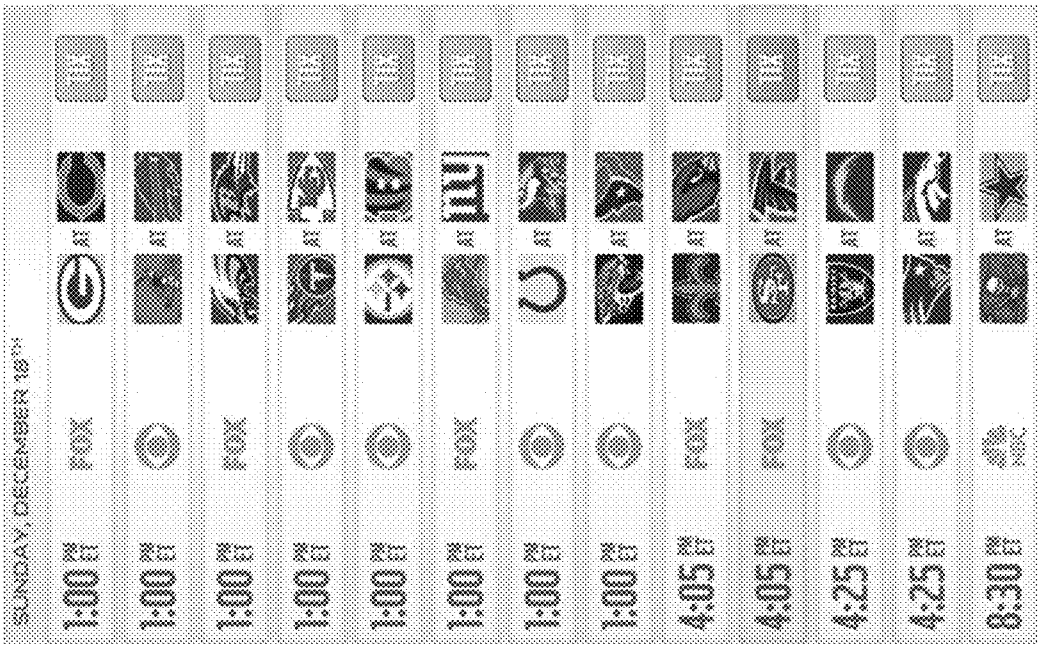
FIG. 11 illustrates a Sunday schedule of NFL football games which may be used for a daily tournament according to the embodiments of the present invention.

FIG. 11 illustrates a Sunday schedule 600 of NFL football games which may be used for a daily tournament according to the embodiments of the present invention. As shown, there are 13 games on the Sunday NFL schedule (i.e., events schedule). Therefore, there are 8192 ($2^{13}$) possible outcomes of wins and losses (1,594,323 possible outcomes if ties are factored in). Thus, a daily contest may involve each entrant being given a substantially equal number of random possible outcomes with the winner(s) being determined in the same manner set forth above. In other words, the Sunday NFL schedule acts as a one round bracket tournament. In another embodiment, a weekly tournament may be conducted using all NFL for that week (i.e., including Monday and Thursday NFL games which increases the number of games to 15 and the number of possible outcomes to 32768 ($2^{15}$) excluding ties.

Figure 14A:
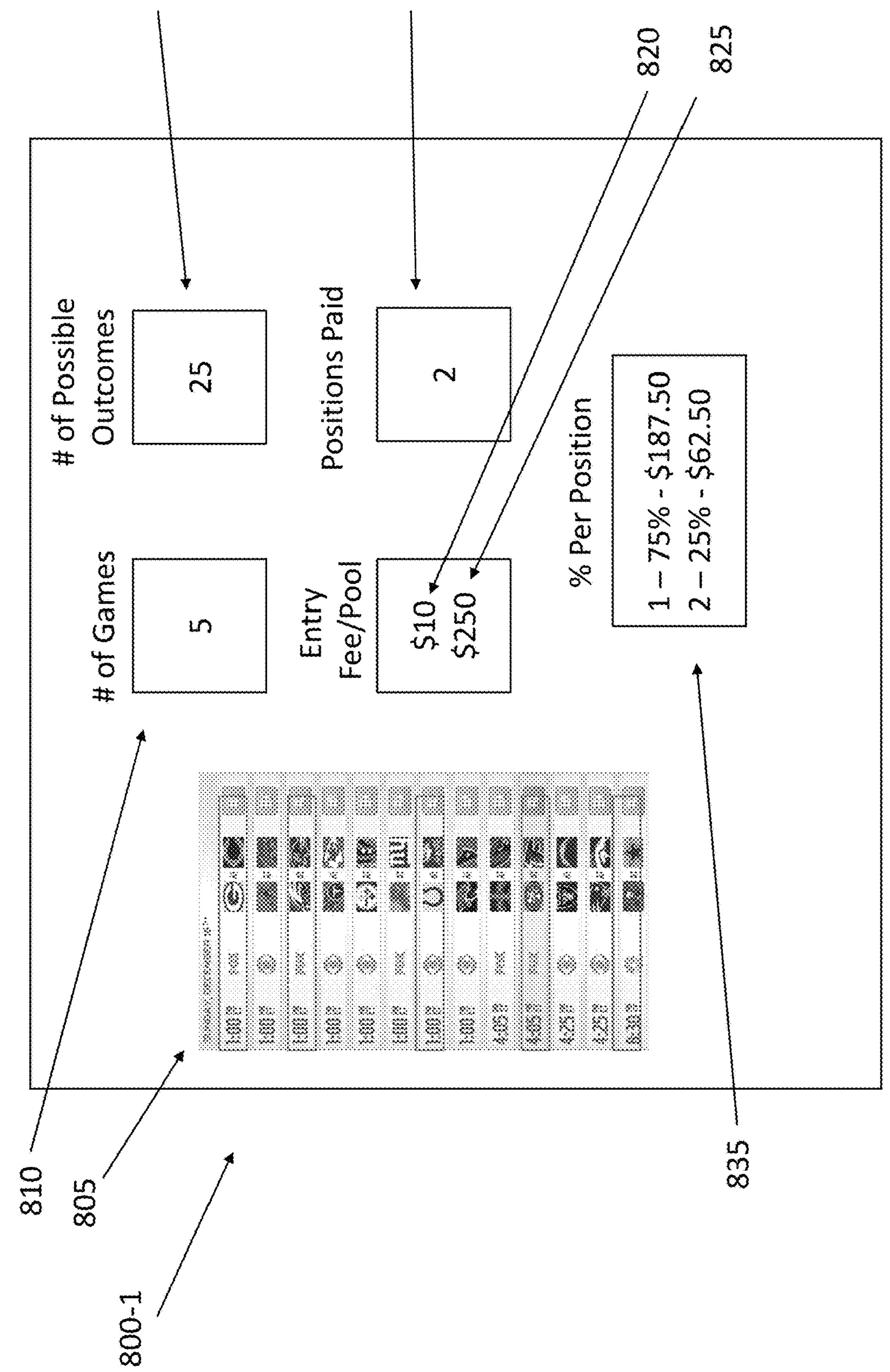
FIGS. 14A-14D illustrate screen shots of an end user customizable contest generator according to the embodiments of the present invention.
Figure 14B:
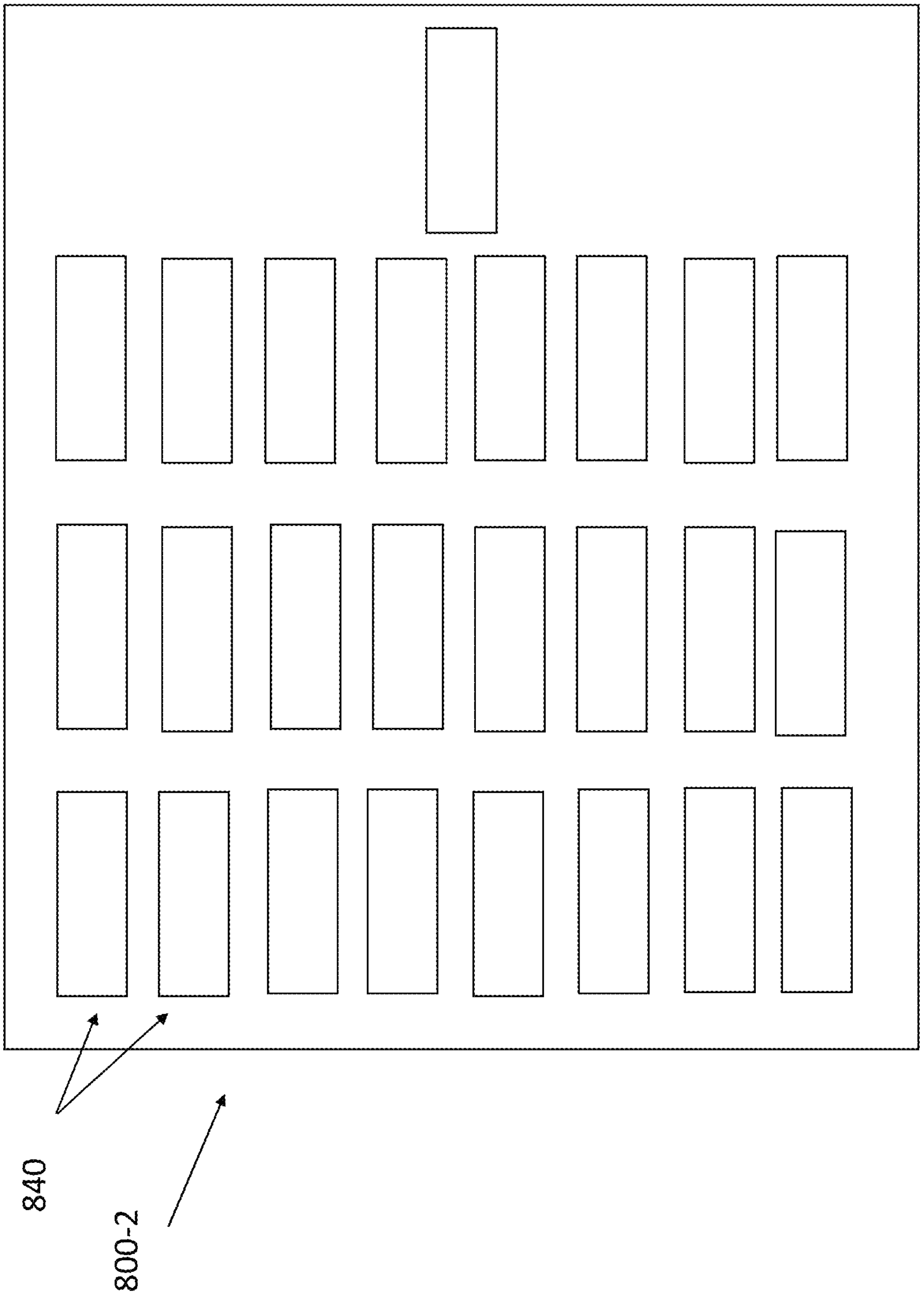
Figure 14C:

In another embodiment, the system is configured such that end-users may create their own tournaments for friends and family. For example, as shown in screen shot 800-1 of FIG. 14A, an end-user may select certain NFL games from a particular Sunday 805 to start a contest. As shown, the end user has selected 5 games 810 generating 25 possible combinations of winners and losers 815. The end user may also enter the entry fee 820, whereby the system generates the corresponding prize pool 825, and the number of paid positions 830—two in this instance. The system then generates the pay table 835 of the contest based on the user entered in the payout percentage breakdown. FIG. 14B shows the 25 possible combinations of winners and losers 840. Once created, the end user sends potential contestants (e.g., family and friends) an active email or text link regarding the contest. Once 25 entries are received, the system emails and/or text messages the contestants their random outcome. The random outcome as sent may simply be a number between 1 and 25 (e.g., 7) corresponding to the group of random winners and losers of the five games, which can be located via another active link. Alternatively, the actual teams that win and lose from one of the random outcomes 840-1 as shown in screen shot 800-2 of FIG. 14C may be sent. The end user may also instruct the system to send the random outcomes if less than 25 entries are received by the start of the contest. In such a case, if the winning outcome fails to be distributed, the contestants may receive a refund of the entry fee or let the entry fee ride on another subsequent contest.

In one embodiment, the system automatically sends reminder emails and/or text messages to the potential contestants indicating that entries remain to be sold and the start of the contest is nearing. Such a reminder may entice additional potential contestants to join the contest.

Figure 14D:
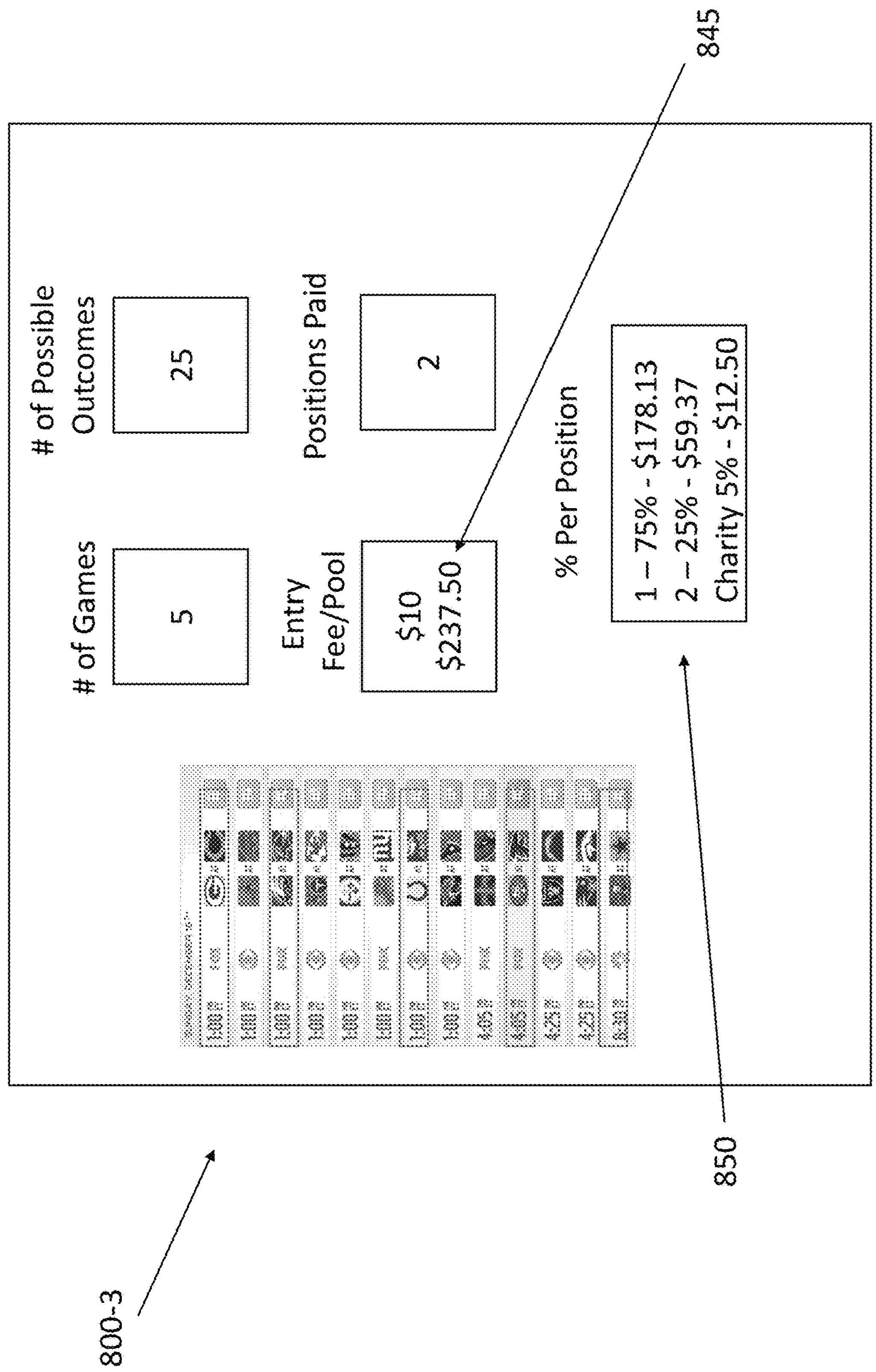

In another embodiment, the end user may keep a portion of the entry fees or use them as a charitable contribution. FIG. 14D shows a screen shot 800-3 where the end user elects to send 5% of the entry fees from screen shot 800-1 to a charity of his/her choosing. As shown, the prize pool 845 has dropped from $250 to $237.50 and the pay table 850 shows the new payout percentage breakdown factoring in the charitable contribution.

Under circumstances when the ratio of the number of total possible outcomes to the total number of entrants is not an integer (i.e., a remainder exists), it is conceivable that each entrant will not receive an equal number of possible outcomes at least when all total possible outcomes are being distributed. In such instances, the system may randomly award one or more entrants with one extra possible outcome. When the number of total possible outcomes is extremely large (e.g., March Madness) the extra possible outcome is insignificant to the odds of winning. If the total number of possible outcomes is not so extreme (e.g., a 4-team tournament), it is possible that the extra outcome(s) may be sold, auctioned, given to charity, given to the entrants having the most entries, or otherwise distributed.

The embodiments of the present invention may be used with sporting event bracket tournaments including game spreads. In other words, to win a game/event, the team must cover the spread not simply win the game.

In one embodiment, the embodiments of the present invention may be used by states to create a lottery. For example, one or more states may create a daily or weekly lottery based on the outcomes of one or more days of sporting events. Contestants can buy tickets comprising random game outcomes seeking to obtain the perfect ticket where all or most of the winners and losers of the games are correct. If a wining ticket is not sold the prize pool may carry over to the next lottery event.

Although the invention has been described in detail with reference to several embodiments, additional variations and modifications exist within the scope and spirit of the invention as described and defined in the following claims.

We claim:

1. A system comprising:

at least memory and one processor running executable instructions related to a group of future events, each future event having a winner and loser; and wherein said at least one processor running said executable instructions:

(i) randomly distributes to multiple contestants a plurality of tickets each comprising possible outcomes of each of said future events, each of said plurality of tickets being unique;

(ii) tracks results of said future events based on assignment of a unique identifier to each possible bracket tournament outcome to reduce use of said memory;

(iii) based on said tracked results of said future events, updates a status of each of said plurality of tickets held by said multiple contestants;

(iv) causes an award or prize to be provided to one or more contestants holding tickets identifying at least a threshold number of future events resulting in a winning outcome.

2. The system of claim 1 wherein said at least one processor running said executable instructions further: receives entry fees and generates a prize pool and pay table.

3. The system of claim 1 wherein said threshold number of future events resulting in a winning outcome is all future events.

4. The system of claim 1 wherein said group of future events are based on a bracket tournament comprising multiple rounds.

5. The system of claim 4 wherein said bracket tournament is the NCAA's Men Basketball Tournament.

6. The system of claim 1 wherein said tickets are tangible, virtual and/or digital.

7. A system comprising:

at least memory and one processor running executable instructions related to a group of future events, each future event having a winner and loser; and wherein said at least one processor running said executable instructions:

(i) randomly distributes to multiple contestants a plurality of tickets comprising possible outcomes of each of said future events such that a ticket associated with every set of possible outcomes is distributed, each of said plurality of tickets being unique;

(ii) tracks results of said future events based on assignment of a unique identifier to each possible bracket tournament outcome to reduce use of said memory;

(iii) based on said tracked results of said future events, updates a status of each of said plurality of tickets held by said multiple contestants;

(iv) causes an award or prize to be provided to the one contestant holding a ticket comprising all winning outcomes.

8. The system of claim 7 wherein said at least one processor running said executable instructions further: receives entry fees and generates a prize pool and pay table.

9. The system of claim 7 wherein said group of future events are based on a bracket tournament comprising multiple rounds.

10. The system of claim 9 wherein said bracket tournament is the NCAA's Men Basketball Tournament.

11. The system of claim 7 wherein said tickets are tangible, virtual and/or digital.

12. The system of claim 7 wherein said at least one processor running said executable instructions further: causes an award or prize to be provided to one or more contestants holding tickets comprising less than all winning outcomes.

13. A system comprising:

at least memory and one processor running executable instructions related to a group of future events, each future event having a winner and loser; and wherein said at least one processor running said executable instructions:

(i) receives user instructions for a contest including selected future events, amount of entry fee, number of paid positions and percentage payout breakdown;

(ii) generates a prize pool and pay table based on entry fee, number of paid positions and percentage payout breakdown;

(iii) transmits contest details to potential contestants as identified by said user;

(iv) receives entries from said contestants;

(v) upon receiving a threshold number of entries, randomly distributes to multiple contestants a plurality of tickets each comprising possible outcomes of each of said future events, each of said plurality of tickets being unique;

(vi) tracks results of said future events based on assignment of a unique identifier to each possible bracket tournament outcome to reduce use of said memory;

(vii) based on said tracked results of said future events, updates a status of each of said plurality of tickets held by said multiple contestants; and (viii) causes an award or prize to be provided to one or more contestants holding tickets identifying at least a threshold number of future events resulting in a winning outcome.

14. The system of claim 13 wherein said tickets are tangible, virtual and/or digital.

15. A system comprising:

at least memory and one processor running executable instructions related to a group of future events, each future event having a winner and loser; and wherein said at least one processor running said executable instructions:

(i) determines a number of contestants;

(ii) divides a total number of possible sets of outcomes associated with said group of future events;

(iii) randomly distributes to each contestant an equal number of tickets comprising said total number of possible sets of outcomes associated with said group of future events, each of said number of tickets being unique;

(iv) tracks results of said future events based on assignment of a unique identifier to each possible bracket tournament outcome to reduce use of said memory;

(v) based on said tracked results of said future events, updates a status of each of said plurality of tickets held by said contestants; and (vi) causes an award or prize to be provided to the at least one contestant holding a ticket comprising all winning outcomes.

16. The system of claim 15 wherein said at least one processor running said executable instructions further: receives entry fees and generates a prize pool and pay table.

17. The system of claim 15 wherein said group of future events are based on a bracket tournament comprising multiple rounds.

18. The system of claim 15 wherein said tickets are tangible, virtual and/or digital.

19. The system of claim 15 wherein said at least one processor running said executable instructions further: causes an award or prize to be provided to one or more contestants holding tickets comprising less than all winning outcomes.

20. A system comprising:

at least memory and one processor running executable instructions related to a group of future events, each future event having a winner and loser creating a finite pool of outcomes;

wherein said at least one processor running said executable instructions:

(i) randomly distributes to multiple contestants a plurality of tickets comprising all finite pool outcomes, each of said plurality of tickets being unique;

(ii) tracks results of said future events based on assignment of a unique identifier to each possible bracket tournament outcome to reduce use of said memory;

(iii) based on said tracked results of said future events, updates a status of each of said plurality of tickets held by said multiple contestants; and (iv) causes an award or prize to be provided to the one contestant holding a ticket comprising all winning outcomes.

* * * * *